United States Patent [19]

Enami et al.

[11] Patent Number: 5,075,357
[45] Date of Patent: Dec. 24, 1991

[54] EPOXY RESIN COMPOSITIONS

[75] Inventors: Hiroji Enami; Takeshi Imai, both of Chiba, Japan

[73] Assignee: Dow Corning Toray Silicone Company, Ltd., Tokyo, Japan

[21] Appl. No.: 583,903

[22] Filed: Sep. 17, 1990

[30] Foreign Application Priority Data

Sep. 21, 1989 [JP] Japan ................................ 1-246203

[51] Int. Cl.$^5$ ...................... C08G 59/44; C08G 59/54; C08J 5/24
[52] U.S. Cl. ...................................... 523/466; 528/27; 525/481; 525/487; 525/523
[58] Field of Search ....................... 525/481, 523, 487; 523/466

[56] References Cited

U.S. PATENT DOCUMENTS 4,282,136  8/1981  Hunt et al. ........................... 528/112
4,929,665  5/1990  Inoue et al. ........................... 523/466

FOREIGN PATENT DOCUMENTS 59-124923  7/1984  Japan.

Primary Examiner—Paul R. Michl
Assistant Examiner—Christopher P. Rogers
Attorney, Agent, or Firm—Alexander Weitz

[57] ABSTRACT

A water resistant epoxy resin composition is disclosed, said composition comprising an epoxy resin, a compound having at least two phenolic hydroxyl groups sufficient to cure the epoxy resin component, an aromatic nitrogen-containing silane coupling agent and an inorganic filler. The epoxy resin composition is well suited for use as a sealant for electronic components.

18 Claims, No Drawings

EPOXY RESIN COMPOSITIONS

The present invention relates to an epoxy resin composition, and, more particularly, relates to an epoxy resin material which has an excellent moisture resistance and is highly qualified as a sealant for electronic components.

BACKGROUND OF THE INVENTION

The last few years have witnessed rapid expansion in the electronic device and equipment sector, and this has resulted in the production of large numbers of semiconductor-based electronic components. Within the arena of epoxy resins used to seal semiconductors, there has also been an accompanying strong demand for technical improvements in correspondence to the required maintenance of the characteristics and properties of semiconductors. Among these, improvements in the moisture resistance of epoxy resins are particularly important.

With regard to the development of epoxy resins in response to this demand, epoxy resin compositions are known in which an epoxy group-containing silane, amino group-containing silane, mercapto group-containing silane, ureide group-containing silane, or phenol group-containing silane has been blended into epoxy resin (for example, refer to Japanese Patent Application Laid Open [Kokai] Number 59-124923 [124,923/84]).

Nevertheless, the moisture resistance of these epoxy resin compositions is still inadequate, and, inter alia, they suffer from a sharp decline in bending strength after a boiling test in water. They are therefore unsatisfactory as sealants for electronic components.

SUMMARY OF THE INVENTION

As the result of extensive research, the present inventors discovered that the admixture of a special silane coupling agent into epoxy resin largely solves the preceding problem, and the present invention was achieved based on this.

In other words, the present invention takes as its object the introduction of a strongly moisture-resistant epoxy resin composition which is highly qualified for use as a sealant for electronic components. The invention therefore relates to a composition comprising:

(A) 100 parts by weight of an epoxy resin having at least two epoxy groups in each molecule;

(B) a sufficient quantity of a compound having at least two phenolic hydroxyl groups in each molecule to cure component (A);

(C) from 0.05 to 70 parts by weight of a silane coupling agent selected from the group consisting of compounds represented by the formulas

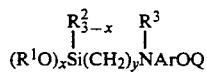

and

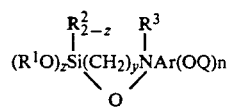

wherein $R^1$ and $R^2$ are monovalent hydrocarbon groups having 1 to 6 carbon atoms, $R^3$ is selected from the group consisting of the hydrogen atom and a monovalent hydrocarbon group having 1 to 6 carbon atoms, Ar is an organic group selected from

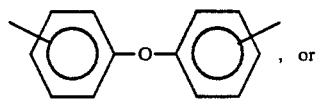

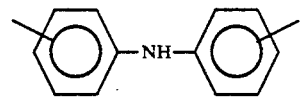

in which Q is selected from the group consisting of the hydrogen atom and a trialkylsilyl group represented by the formula $-SiR^4_3$, where $R^4$ is an alkyl group having 1 to 6 carbon atoms, x is an integer between 1 and 3, y is an integer between 1 and 6, z is 1 or 2 and n is an integer between zero and 2; and (D) from about 30 to about 600 parts by weight of an inorganic filler.

DETAILED DESCRIPTION OF THE INVENTION

The present invention relates to a composition composed of (A) an epoxy resin, (B) a compound for curing component (A), (C) a silane coupling agent, described infra, and (D) an inorganic filler.

To explain this in greater detail, the epoxy resin comprising component (A) should be a compound which has at least 2 epoxy groups in its molecule and is cured by the compound having phenolic hydroxyl groups as discussed below for component (B), but its molecular structure and molecular weight are not specifically restricted. Epoxy resins within this context are exemplified by bisphenol-based aromatic epoxy resins, alicyclic epoxy resins based on, for example, cyclohexane derivatives, epoxy novolac-type epoxy resins, and halogen atom-containing (chlorine, bromine, etc.) epoxy resins.

The component (B) used by the present invention functions as a curing agent in order to cure the aforementioned component (A), and it takes the form of a compound which has at least 2 phenolic hydroxyl groups in each molecule. Again, its molecular structure and molecular weight are not specifically restricted. Examples of such compounds are phenol novolac-type phenolic resins and cresol novolac-type phenolic resins. This component should be used in quantities sufficient to bring about the curing of component (A), as readily determined by routine experimentation.

The silane coupling agent comprising component (C) is the component which distinguishes or characterizes the invention under consideration, and it functions to bring about a remarkable improvement in the moisture resistance of the composition of the present invention. Silane (C) is selected from the group consisting of compounds having formulas (i) and (ii):

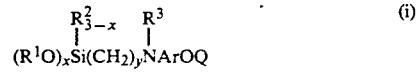

-continued

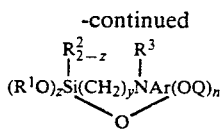

In the above formulas, the groups $R^1$ and $R^2$ are independently selected monovalent hydrocarbon groups having 1 to 6 carbon atoms as exemplified by alkyl groups such as methyl, ethyl, propyl, and butyl; $R^3$ is the hydrogen atom or a monovalent hydrocarbon group having 1 to 6 carbon atoms, as exemplified by alkyl groups such as methyl, ethyl, propyl, and butyl, and aryl groups such as phenyl; the group Ar is an organic group selected from

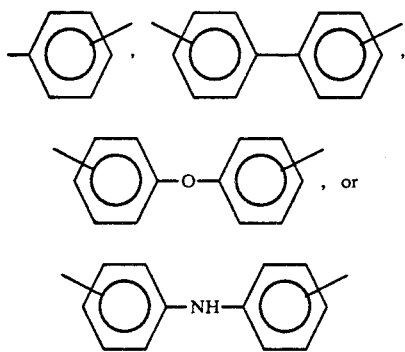

and the group Q is the hydrogen atom or a trialkylsilyl group as represented by $-SiR^4_3$ in which $R^4$ is an alkyl group having 1 to 6 carbon atoms, such as methyl, ethyl, and propyl. Furthermore, x is an integer having a value of 1 to 3, y is an integer having a value of 1 to 6, z is an integer having a value of 1 or 2, and n is an integer having a value of zero to 2.

The silane coupling agent under consideration is exemplified by the following compounds.

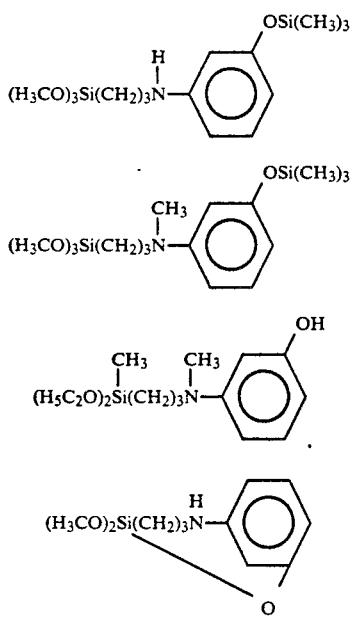

Component (C) can be prepared, for example, by a dehydrohalogenation reaction between (a) a triorganosilylalkyl halide and (b) an aminophenol, in the presence of (c) a hydrogen halide binder. The triorganosilylalkyl halide may be represented by the following general formula

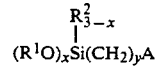

wherein $R^1$ and $R^2$ have their above defined meanings; the group A is a halogen atom selected from fluorine, chlorine, bromine or iodine; and x and y also have their above defined values.

The aminophenol (b) may be represented by the general formula

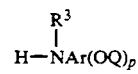

wherein Q, Ar and $R^3$ have their above defined meanings and p is an integer having a value of 1 or 2.

The triorganosilylalkyl halide, or derivative thereof, comprising the component (a) used by this method is its principal starting material. Organosilicon compounds corresponding to this component (a) can be procured on an industrial basis. These organosilicon compounds are exemplified by gamma-chloropropyltrimethoxysilane and gamma-chloropropylmethyldimethoxysilane.

The aminophenol, or derivative thereof, comprising the component (b) used by this method participates in a dehydrohalogenation reaction with the aforesaid component (a) in the presence of a hydrogen halide binder to afford the silane coupling agent comprising component (C). Among such compounds, the following, for example, are available on an industrial basis: meta-aminophenol, ortho-aminophenol, para-aminophenol, and so forth.

When too little of silane (C) is added, no effects associated with its addition will appear, while the addition of too much will impair the native properties of the epoxy resin. Accordingly, it should be added at 0.05 to 70 weight parts, and preferably at 0.1 to 35 weight parts, per 100 weight parts component (A).

The inorganic filler (D) used by the present invention imparts such physical properties as cracking resistance, low stress, etc., to the composition of the present invention. This component takes the form of those fillers typically used in epoxy or silicone resins, and examples in this regard are silica, talc, mica, clay, glass fiber, etc. The component under consideration should be added at about 30 to about 600 weight parts and preferably at 200 to 450 weight parts per 100 weight parts component (A).

As necessary, various additives may also be suitably added and mixed into the epoxy resin composition of the present invention as long as the object of the present invention is not compromised, and examples here are release agents, such as natural and synthetic waxes and the metal salts of straight-chain fatty acids; flame retardants, such as antimony trioxide; colorants such as carbon black; curing accelerators, such as imidazole and derivatives thereof, tertiary amine derivatives, and phosphine derivatives; stress-reducing agents, such as silicones; and so forth.

The epoxy resin composition of the present invention is quite easily prepared by mixing the aforementioned components (A) through (D) to homogeneity, or by mixing the aforementioned components (A) through (D) to homogeneity along with the various additives. In the case of use as a molding material, the epoxy resin is preferably converted into a particulate by grinding or pulverizing to a suitable size.

EXAMPLES

The present invention is explained in greater detail below through illustrative examples, in which parts=-weight parts.

EXAMPLE 1

Three hundred and fifty parts of fused silica (FB-74 from Denki Kagaku Kogyo Kabushiki Kaisha, Japan) was placed in a Henschel mixer and preliminarily mixed for 15 minutes while spraying in 1.4 parts silane coupling agent as reported in Table 1. To this were then added 100 parts cresol novolac-type epoxy resin (EOCN-1020 from Nippon Kayaku Kabushiki Kaisha, Japan) 50 parts phenol novolac resin (BRG-557 from Showa Kobunshi Kabushiki Kaisha), 1 part carnauba wax (release agent), and 1.5 parts phenylphosphine (curing accelerator) followed by mixing and kneading for 4 to 6 minutes on a six-inch two-roll mill heated to 70 to 90 degrees Centigrade. Cooling then afforded the epoxy resin composition, which was pulverized to give the granular epoxy resin composition. The bending strength, water absorption, and bending strength after immersion in boiling water were measured on the obtained epoxy resin after curing and its fluidity when uncured was also measured. The obtained measurement values are reported in Table 2. The following measurement methods were employed.

Measurement of the Bending Strength, Water Absorption, and Bending Strength after Immersion in Boiling Water The epoxy resin composition was molded into a 90×10×4 (mm) test specimen under the following conditions using a transfer molder: molding temperature=175 degrees Centigrade, molding pressure=70 kg/cm², and molding time=2 minutes.

The obtained test specimen was post-cured for 9 hours at 170 degrees Centigrade, and the bending strength and water absorption were measured on the post-cured test specimen in accordance with JIS K611-1979 (General Test Methods for Thermosetting Plastics).

With regard to testing after immersion in boiling water, a test specimen post-cured as above was introduced into a pressure cooker (2 atm, 120 degrees Centigrade), maintained there for 96 hours, removed, and its bending strength was then measured.

Measurement of the Fluidity

The spiral flow was measured based on SPI-EMMI 1-66, and this value is reported for the fluidity.

TABLE 1

| composition number | silane coupling agent |
|---|---|
| 1 | (CH₃)₃SiO—⟨phenyl⟩—NHCH₂CH₂CH₂Si(OCH₃)₃ |

TABLE 1-continued

| composition number | silane coupling agent |
|---|---|
| 2 | (H₃CO)₂Si(CH₂)₃NH—⟨phenyl⟩—O (fused ring) |
| 3 | (CH₃)₃SiO—⟨phenyl⟩—NHCH₂CH₂CH₂Si(OCH₃)₃ |

TABLE 2

| composition number | bending strength (kgf/mm²) initial | bending strength (kgf/mm²) after immersion in boiling water | water absorption (%) | spiral flow (inch) |
|---|---|---|---|---|
| 1 | 16.1 | 13.7 | 0.69 | 43 |
| 2 | 16.3 | 13.4 | 0.70 | 42 |
| 3 | 16.7 | 13.5 | 0.68 | 43 |

EXAMPLE 2

Epoxy resin compositions were prepared as in Example 1, but using the following silane coupling agent in the quantity of addition reported in Table 3 in place of the 1.4 parts silane coupling agent reported in Table 1 of Example 1.

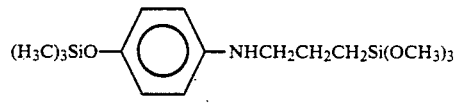

The bending strength after curing, bending strength after immersion in boiling water, water absorption, and fluidity were measured on these epoxy resin compositions as in Example 1, and these measurement results are reported in Table 4.

TABLE 3

| composition number | use quantity of silane coupling agent (parts) |
|---|---|
| 4 | 0.5 |
| 5 | 1.0 |
| 6 | 3.0 |

TABLE 4

| composition number | bending strength (kgf/mm²) initial | bending strength (kgf/mm²) after immersion in boiling water | water absorption (%) | spiral flow (inch) |
|---|---|---|---|---|
| 4 | 16.0 | 12.5 | 0.69 | 41 |
| 5 | 15.9 | 12.8 | 0.71 | 42 |
| 6 | 15.7 | 13.0 | 0.71 | 42 |

COMPARISON EXAMPLE

Epoxy resin compositions were prepared proceeding as in Example 1, but using the silane coupling agents given below in Table 5 in place of the silane coupling agents given in Table 1 for Example 1. The properties of these compositions were measured as in Example 1, and the obtained results are reported in Table 6.

TABLE 5

| composition number | silane coupling agent |
|---|---|
| 7 | 3-glycidoxypropyltrimethoxysilane |
| 8 | 3-ureidopropyltrimethoxysilane |
| 9 | 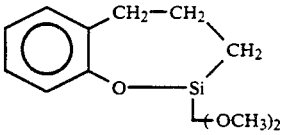 |

TABLE 6

| composition number | bending strength (kgf/mm²) initial | bending strength (kgf/mm²) after immersion in boiling water | water absorption (%) | spiral flow (inch) |
|---|---|---|---|---|
| 7 | 13.8 | 11.0 | 0.87 | 42 |
| 8 | 13.2 | 11.5 | 0.67 | 43 |
| 9 | 12.7 | 9.6 | 0.71 | 48 |

We claim:
1. A composition comprising:
 (A) 100 parts by weight of an epoxy resin having at least two epoxy groups in each molecule;
 (B) a sufficient quantity of a compound having at least two phenolic hydroxyl groups in each molecule to cure said epoxy resin (A);
 (C) from 0.05 to 70 parts by weight of a silane coupling agent selected from the group consisting of compounds represented by the formulas

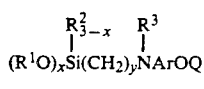  (i)

and

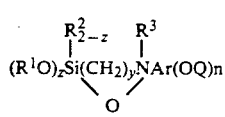  (ii)

wherein $R^1$ and $R^2$ are monovalent hydrocarbon groups having 1 to 6 carbon atoms, $R^3$ is selected from the group consisting of the hydrogen atom and a monovalent hydrocarbon group having 1 to 6 carbon atoms, Ar is an organic group selected from the group consisting of

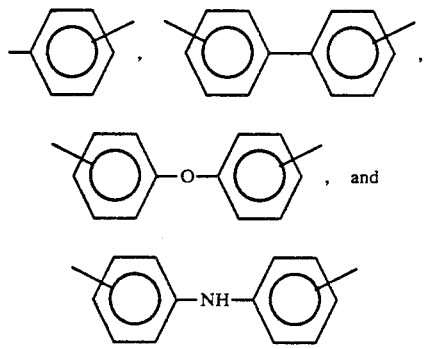

in which Q is selected from the group consisting of the hydrogen atom and a trialkylsilyl group represented by the formula —$SiR^4_3$, where $R^4$ is an alkyl group having 1 to 6 carbon atoms, x is an integer between 1 and 3, y is an integer between 1 and 6, z is 1 or 2 and n is an integer between zero and 2; and (D) from about 30 to about 600 parts by weight of an inorganic filler.

2. The composition according to claim 1, wherein $R^1$ and $R^2$ of said silane (C) are each independently selected from alkyl radicals having 1 to 4 carbon atoms.

3. The composition according to claim 2, wherein $R^1$ of said silane (C) is a methyl radical.

4. The composition according to claim 3, wherein $R^3$ and $R^4$ of said silane (C) are each a methyl radical.

5. The composition according to claim 4, wherein y of said silane (C) is 3.

6. The composition according to claim 5, wherein Ar of said silane (C) is

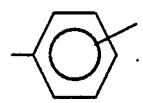

7. The composition according to claim 6, wherein $R^2$ of said silane (C) is a methyl radical.

8. The composition according to claim 7, wherein said filler (D) is silica.

9. The composition according to claim 6, wherein said silane (C) is represented by a formula selected from the group consisting of

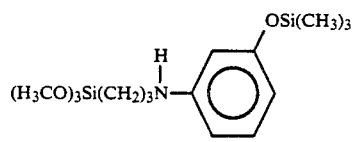

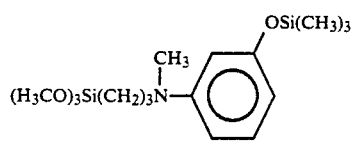

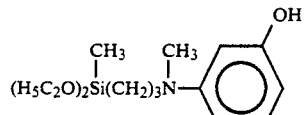

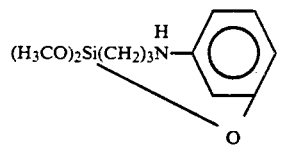

10. An article of manufacture prepared from the composition of claim 1.
11. An article of manufacture prepared from the composition of claim 2.
12. An article of manufacture prepared from the composition of claim 3.
13. An article of manufacture prepared from the composition of claim 4.
14. An article of manufacture prepared from the composition of claim 5.
15. An article of manufacture prepared from the composition of claim 6.
16. An article of manufacture prepared from the composition of claim 7.
17. An article of manufacture prepared from the composition of claim 8.
18. An article of manufacture prepared from the composition of claim 9.

* * * * *